United States Patent [19]

Osborne

[11] 4,398,623

[45] Aug. 16, 1983

[54] INTERNAL SHOE DRUM BRAKE ADJUSTING DEVICE

[75] Inventor: Duncan W. Osborne, Leamington Spa, England

[73] Assignee: Automotive Products Limited, Leamington Spa, England

[21] Appl. No.: 302,544

[22] Filed: Sep. 16, 1981

[30] Foreign Application Priority Data

Sep. 19, 1980 [GB] United Kingdom ................. 8030387

[51] Int. Cl.³ ............................................. F16D 65/52
[52] U.S. Cl. ..................... 188/79.5 GE; 188/79.5 GC; 188/79.5 P; 188/196 V; 192/111 A
[58] Field of Search ............... 188/79.5 GC, 79.5 GT, 188/79.5 P, 79.5 GE, 196 R, 196 V; 192/111 A

[56] References Cited

U.S. PATENT DOCUMENTS 3,279,566 10/1966 Belart .......................... 188/196 V X
4,232,766 11/1980 Rupprecht ...................... 188/79.5 P

FOREIGN PATENT DOCUMENTS 2010907 10/1971 Fed. Rep. of Germany ... 188/79.5 P
1314230 4/1973 United Kingdom .

Primary Examiner—George E. A. Halvosa
Attorney, Agent, or Firm—Kemon & Estabrook

[57] ABSTRACT

An internal shoe drum brake automatic adjuster comprising a strut extending between one brake shoe and a wedge mounted between the strut and an abutment on the other brake shoe. The wedge is spring loaded to increase the spacing between the adjacent end of the strut and the abutment. The abutment is pivoted to the shoe and spring loaded against the wedge to maintain a clearance 'S' between the abutment and a stop secured to the shoe.

6 Claims, 4 Drawing Figures

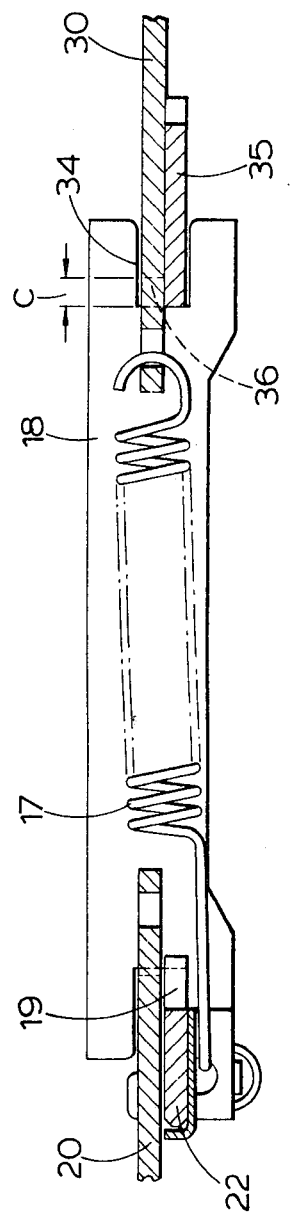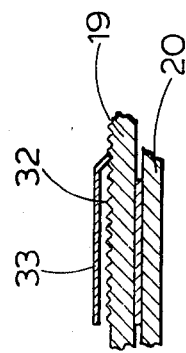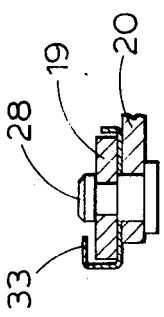

INTERNAL SHOE DRUM BRAKE ADJUSTING DEVICE

This invention relates to automatic adjusters for internal shoe drum brakes for maintaining a substantially constant clearance between the brake linings and the internal surface of the brake drum.

Such adjusters are shown in our British Patent Specification No. 1 314 230, and in Auslegeschrift 26 44 575. In both the above specifications a strut extends between one brake shoe and a wedge member mounted on the other brake shoe. The wedge is spring biased to increase the spacing between the end of the strut and an abutment on the other shoe. The strut is biased against the wedge by a spring extending from the other brake shoe to the strut, and a second spring is utilized to take up a lost motion connection between the strut and the one brake shoe. The correct balance in the loads on the strut exerted by the two springs is essential to the correct workings of the adjuster mechanism.

The present invention seeks to provide an adjuster which utilizes a spring loaded wedge and a strut and which overcomes the disadvantages of the prior art.

Accordingly, there is provided an internal shoe drum brake automatic adjuster comprising a strut extending between one brake shoe and a wedge mounted between the strut and an abutment on the other brake shoe, the wedge being biased by a spring to increase the spacing between the adjacent end of the strut and the abutment characterised in that the abutment is pivoted by a pin to said other brake shoe and a second spring loads the free end of the abutment against the wedge so as to tend to maintain a clearance 'S' between the abutment and a stop on the other shoe.

Preferably the lost motion space is formed by having a round peg on the web of the other brake shoe extending into a clearance hole in the abutment.

The invention will be described by way of example and with reference to the accompanying drawings in which:

FIG. 2 is a part section on the line II—II of FIG. 1;

FIG. 3 is a section on the line III—III of FIG. 1; and

FIG. 4 is a section on the line IV—IV of FIG. 1.

Figure 1:
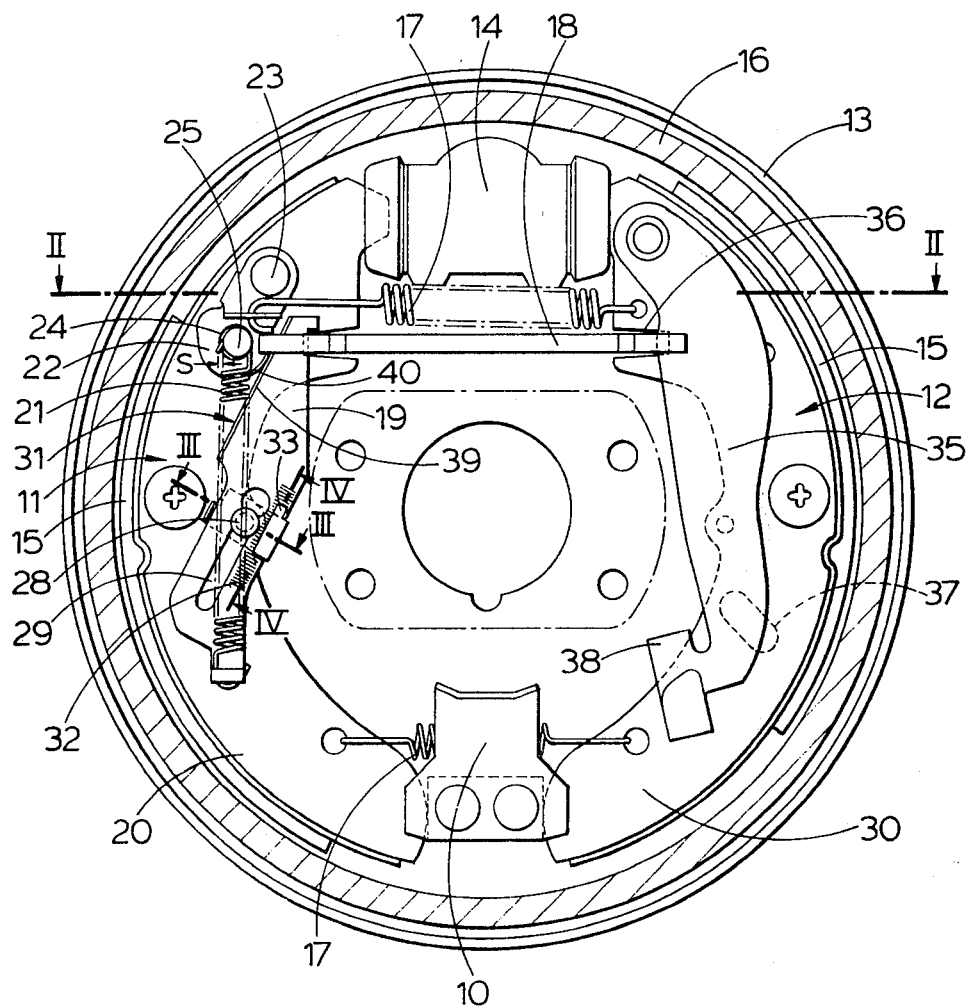
FIG. 1 is an elevation of a brake drum assembly having an adjusting device according to this invention.

With reference to FIGS. 1 to 4, an internal shoe drum brake assembly has a pair of arcuate brake shoes 11 and 12 mounted on a back plate 13. A hydraulic double ended cylinder 14 is mounted between one pair of adjacent ends of the brake shoes 11 and 12 so as to move that pair of ends apart when the brakes are applied. The other pair of adjacent ends of the shoes 11 and 12 pivot on an abutment 10 mounted on the back plate.

When the hydraulic cylinder 14 is operated the brake shoe linings 15 are thrust against the internal surface of a brake drum 16, and when the brakes are released a pair of pull-off springs 17 retract the linings 15 away from the drum 16. The space between linings 15 and the internal surface of the drum is kept substantially constant as the linings wear. To this end an automatic brake adjusting mechanism is mounted between the end portions of the shoes 11 and 12 adjacent the hydraulic cylinder 14. The automatic adjuster mechanism comprises a strut 18 having a slot 34 on one end thereof that locates in a slot 36 in the web 30 of the one brake shoe 12, and extends between the web 30 and a wedge 19 mounted on the web 20 of the other shoe 11.

The slot 34 in the one end of the strut also accommodates a mechanically applied lever 35 pivoted to the end of the shoe 12 adjacent the hydraulic cylinder 14. The lever 35 is shown in the normal service 'off' position and is held in the position shown by an abutment 38 on its free end which locates against the web 30. The strut 18 reacts back onto the lever 35 and not onto the shoe web 30, and this is accommodated by clearance 'C' in slot 36 in the web 30 (see FIG. 2). To deadjust the brakes a screwdriver is inserted through an aperture 37 in the back plate 13 and the lever 35 lifted until the abutment 38 on its free end comes clear of the web 30. The lever 35 can now be pivoted anti-clockwise until the upper end of the lever no longer contacts the strut 18. The clearance 'C' is not taken up under the bias of the springs 17 and the brake deadjusted to allow the drum 16 to be removed for servicing of the brake assembly.

The wedge 19 is biased upwards by a spring 21 to increase the spacing between the end of the strut 18 and an abutment 22 on the web 20. The abutment 22 is pivoted at one end by a pin 23 to the web 20 and its free end is spring loaded by the pull-off spring 17 against one side of the wedge 19. The movement of the abutment 22 about the pin 23 is limited by a lost motion connection between the abutment and the shoe 11. The lost motion connection consists of a circular hole 24 in the abutment and a round peg 25 fixed to the web 20 and loosely engaging the hole 24. Thus the wedge 19 and strut 18 form a cross member between the two shoes 11 and 12 whose overall length can increase as the wedge moves upwards. The upwards movement of the wedge is guided by a pin 28 fixed to the web 20 and engaging a slot 29 in the wedge 19.

The inclined face 31 of the wedge 19 adjacent the abutment has serrations 39 thereon that engage similar serrations 40 on the abutment 22. The upper surface of the wedge away from the shoe web 20 has also serrations 32 thereon for engagement with a pawl 33 fitted to the pin 28 so that the wedge 19 can only move upwards to increase the spacing between the abutment 22 and the strut 18 and not in the reverse direction.

When the brakes are in the "ready-for-use" condition, the spring 17 pulls the abutment 22 against the serrated face 13 of the wedge 19 and pulls the wedge into engagement with the strut 18.

When the brakes are applied, the shoes 11 and 12 are moved apart by the cylinder 14. As the shoes move apart, the spring 17 holds the free end of the abutment 22 against the wedge 19 and the peg 25 moves outwards. If the total gap between the linings 15 and the drum is less than the space 'S' between the peg 25 in its starting position and the side of the hole 24, then on release of the brakes the shoes will retract without readjustment taking place.

If, however, the total gap between the linings 15 and the drum exceeds the space 'S', when the brakes are applied the leg 25 abuts the side of the hole 24 and starts to rotate the abutment 22 away from the wedge 19. When the excess gap is less than the fall back between the serrations on the face 31, and abutment 22, the serrations do not fully disengage and on retraction of the shoes the abutment 22 will move against the wedge causing it to re-engage the wedge 19 without readjustment taking place.

When the excess gap exceeds the space 'S' plus the fall back between the serrations, the peg 25 moves the abutment 22 away from the side of the wedge so that the spring 21 can move the wedge upwards until such point at which the wedge again contacts the abutment and the serrations partially re-engage. When the brakes are released the shoes 11 and 12 retract and the serrations fully engage and the spring 17 pulls shoes together to move the pin 25 rightwards compared to the hole 24 in the abutment. The previous upwards movement of the wedge will have extended the overall length of the cross member constituted by the wedge 19 and strut 18.

Thus a substantially constant clearance between the linings 15 and the drum 16 of the distance 'S' plus the "fall back" of the serrations is maintained. The serrations 31 on the surface of the wedge away from the web 30 prevent the load in the pull-off springs 17 from moving the wedge in a deadjusting direction.

Whilst the adjuster has been described with the strut 18 attached directly to the one brake shoe 12, it is envisaged that this invention would extend to the situation where the strut 18 is located in a slot in a hand brake operating lever pivoted on the shoe 12.

I claim:

1. An internal shoe drum brake having an automatic adjuster and comprising;

two brake shoes;

a strut extending from one of said brake shoes towards the other of said brake shoes;

an abutment means pivoted to said other brake shoe and having a free end thereof capable of limited movement relative to said other brake shoe;

a stop means on said other brake shoe and which has a lost-motion connection with the free end of the abutment means so as to limit the movement of the free end;

a wedge mounted on said other brake shoe and located between the free end of the abutment means and the strut;

a spring biasing the wedge to increase the spacing between the free end of the abutment means and the strut;

and a second spring loading the free end of the abutment means against the wedge.

2. An internal shoe drum brake as claimed in claim 1, wherein the second spring extends between the abutment means and the one brake shoe.

3. An internal shoe drum brake as claimed in claim 1, wherein the lost-motion connection comprises an aperture defined in the abutment means and the stop means is a projection on the other brake shoe extending with play into the aperture.

4. An internal shoe drum brake as claimed in claim 3, wherein the lost-motion connection comprises a circular hole defined in the abutment means and the projection is a round peg on the other brake shoe.

5. An internal shoe drum brake as claimed in claim 1, wherein the wedge is guided for movement by a pin fixed to the other brake shoe and engaging in a slot defined in the wedge.

6. An internal shoe drum brake as claimed in claim 1, wherein the abutment means has serrations adjacent an inclined face of the wedge.

* * * * *